United States Patent [19]

Angst et al.

[11] Patent Number: 4,758,103
[45] Date of Patent: Jul. 19, 1988

[54] METHOD AND APPARATUS FOR QUIETING THE OPERATION OF A DOT MATRIX PRINTER

[75] Inventors: Tim V. Angst; Mark E. Bunke; Phuc K. Do; Nicholas J. Krull; Demetrios Troupes; Carol E. Wyke, all of Charlotte, N.C.

[73] Assignee: International Business Machines Corporation, Armonk, N.Y.

[21] Appl. No.: 852,188

[22] Filed: Apr. 15, 1986

[51] Int. Cl.[4] .............................................. B41J 3/12
[52] U.S. Cl. .............................. 400/121; 101/93.05; 400/689
[58] Field of Search ................ 400/689, 121, 54, 124, 400/74, 719; 101/93.05, 93.04

[56] References Cited

FOREIGN PATENT DOCUMENTS 144170 11/1981 Japan ..................................... 400/689
71174  4/1983 Japan ..................................... 400/54
174363 10/1984 Japan ..................................... 400/689

OTHER PUBLICATIONS

*IBM Tech. Disc. Bulletin*, B. R. Cavill et al, vol. 24, No. 11A, Apr. 1982, pp. 5430–5432.

*Primary Examiner*—Paul T. Sewell
*Attorney, Agent, or Firm*—Bell, Seltzer, Park & Gibson

[57] ABSTRACT

A method and apparatus for quieting the operation of a dot matrix printer by logically dividing the data to be printed among timed spaced printing passes is disclosed. A matrix of data to be printed is stored in a memory. A slice of data is selected from the stored data and the number of dots to be printed simultaneously is reduced by logically allocating the data in each slice among complementary submatrices. Each submatrix of data is printed substantially aligned with each other submatrix in two passes of the print head across the print medium to represent the entire selected slice of data. Noise reduction is achieved by reducing the number of data dots simultaneously printed at each print location.

16 Claims, 3 Drawing Sheets

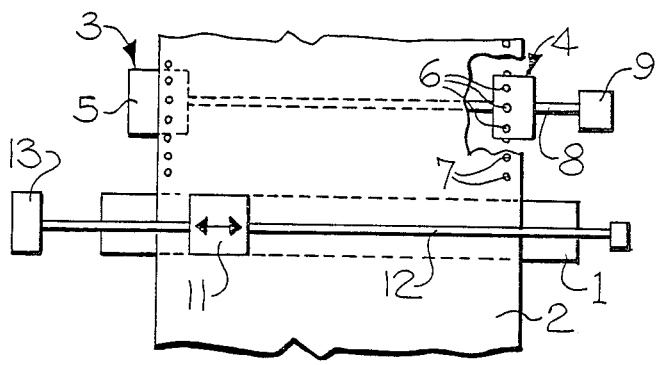
Fig-1
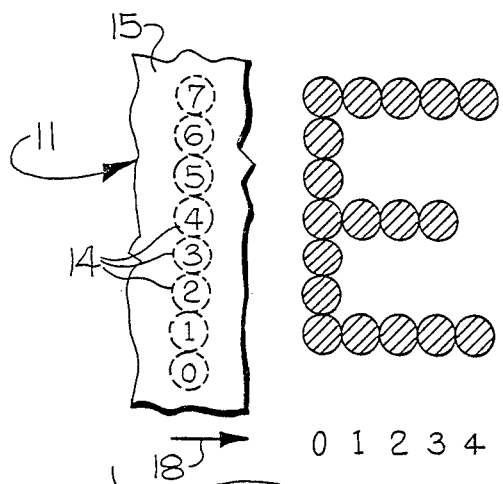
Fig-2
Fig-3
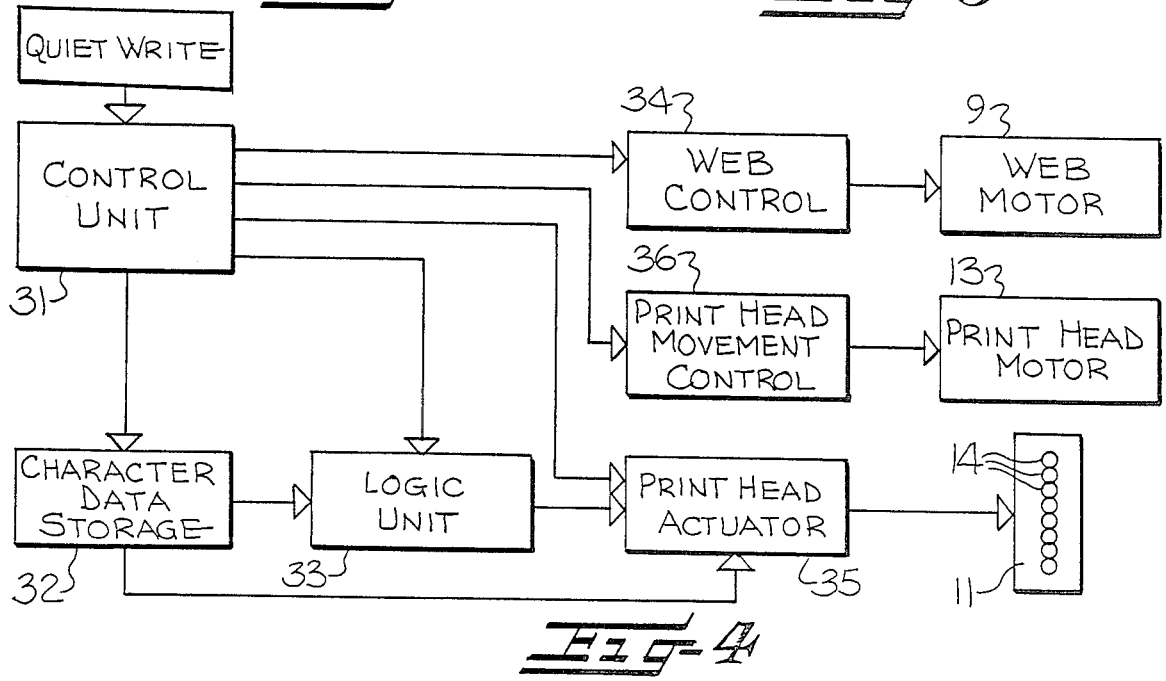
Fig-4

| nibble bit pattern | even data slice | |
|---|---|---|
| | 1st pass, upper nibble 2nd pass, lower nibble | 2nd pass, upper nibble 1st pass, lower nibble |
| 1 1 1 1 | 1 0 1 0 | 0 1 0 1 |
| 1 1 1 0 | 1 0 1 0 | 0 1 0 0 |
| 1 1 0 1 | 1 0 0 1 | 0 1 0 0 |
| 1 1 0 0 | 1 0 0 0 | 0 1 0 0 |
| 1 0 1 1 | 1 0 1 0 | 0 0 0 1 |
| 1 0 1 0 | 1 0 0 0 | 0 0 1 0 |
| 1 0 0 1 | 1 0 0 0 | 0 0 0 1 |
| 1 0 0 0 | 1 0 0 0 | 0 0 0 0 |
| 0 1 1 1 | 0 1 0 1 | 0 0 1 0 |
| 0 1 1 0 | 0 1 0 0 | 0 0 1 0 |
| 0 1 0 1 | 0 1 0 0 | 0 0 0 1 |
| 0 1 0 0 | 0 1 0 0 | 0 0 0 0 |
| 0 0 1 1 | 0 0 1 0 | 0 0 0 1 |
| 0 0 1 0 | 0 0 1 0 | 0 0 0 0 |
| 0 0 0 1 | 0 0 0 1 | 0 0 0 0 |
| 0 0 0 0 | 0 0 0 0 | 0 0 0 0 |
| nibble bit pattern | 2nd pass, upper nibble 1st pass, lower nibble | 1st pass, upper nibble 2nd pass, lower nibble |
| | odd data slice | |
WIRE FIRE REPLACEMENT TABLE

4,758,103

METHOD AND APPARATUS FOR QUIETING THE OPERATION OF A DOT MATRIX PRINTER

FIELD OF THE INVENTION

The present invention relates to a method and apparatus for quieting the operation of a dot matrix printer by reducing the number of data dots that are printed simultaneously. The data is allocated among complementary submatricies which are printed during time spaced passes of the print head to reduce printer noise.

BACKGROUND OF THE INVENTION

Dot matrix printers are one method of recording information stored in or generated by a data processing system. In dot matrix printers, each character or segment of a graphical image is comprised of a matrix of dots and blanks which together define the character. On close examination, the dots are arranged in a matrix of positions that together form horizontal rows and vertical columns that are adjacent, parallel and evenly spaced. The intersections of the rows and columns determine the locations of the dots and blanks, and the dots may overlap, depending on the spacing between matrix intersections and dot diameter. Each dot or blank comprising the printed character or image segment is represented in the data processing apparatus by a binary data element with a binary 1 typically representing a dot and a binary 0 typically representing a blank. Data representing a typical character may be formed from a matrix having a vertical column height of eight dot positions and a horizontal width of five dot positions, although the number of positions in either direction may vary as desired. Although alphanumeric characters are used to describe the present invention, they are exemplary because the invention may be used for any dot matrix data, including graphics.

Dot matrix printers typically include a horizontally reciprocating print head which is used to form the characters on a web such as paper. The print head usually consists of a vertically oriented column of seven or eight print wires, each of which may be selectively extended (or fired) as the print head traverses each horizontal line (or print line) of the web. When fired, the wire impacts an inked ribbon onto the web and thereby transfers the image.

It is well-known that printers, including printers of the dot matrix type, are noisy during operation. This noise distracts workers, inhibits concentration, makes conversation difficult, and is generally undesirable. Various approaches have been tried to reduce printer noise, but none have been completely satisfactory, even though some clearly recognize that the volume of the noise generated by the printer is proportional to the number of print wires firing simultaneously. A first approach simply admits that the print head is inherently noisy and focuses on tightly enclosing the printer in an effort to contain the noise. While this has met with some success, it merely masks the symptoms without solving the underlying problem. Moreover, due to the inherent necessity of opening the enclosure to feed blank paper, remove printed paper, connect cables, etc., it is not possible to satisfactorily solve the problem using this technique.

Another approach inclines the column of print wires of the print head. For example, one print head has the eight print wires arranged along a diagonal line. However, the timing of the firing of the canted print wires in this print head is complex, and does not reduce the number of simultaneous wire fires unless the character font is also specially designed to be at a different incline than the incline of the column of wires in the print head. In other words, when printing graphics, or a non-specialized font character, the noise level will not be diminished. In a related technique, the character font is specially designed to reduce the number of dots in each vertical column or slice of the character. Although fewer dots are simultaneously printed at each print location, it quiets operation only for this unique font, it is of no avail with other fonts or graphics, and it comes at the expense of degrading character resolution and quality.

In still another technique, the print head makes two passes, printing every other column on each pass. This still does not solve the noise problem because it does not reduce the number of simultaneous wire fires at each of the individual print locations.

Accordingly, it is an object of the present invention to provide a method and apparatus for quieting the operation of a dot matrix printer.

It is a further object of the present invention to provide a method and apparatus for quieting the operation of a dot matrix printer and still print all of the data dots at substantially every print location.

It is a further object of the present invention to provide a method and apparatus for quieting the operation of a dot matrix printer by reducing the number of print wires firing simultaneously at substantially every location without reducing the total number of data dots printed.

It is a further object of the present invention to provide a method and apparatus for quieting the operation of a dot matrix printer by logically allocating the data to be printed at each location into complementary submatrices which are printed during time spaced printing operations.

It is a further object of the present invention to provide a method and apparatus for selectively operating a dot matrix printer in a quiet mode of operation.

SUMMARY OF THE INVENTION

The operation of a dot matrix printer is quieted by logically dividing the data to be printed among timed spaced printing operations. A matrix of data to be printed is stored. A slice of data is selected from the stored matrix of data to be printed. The number of dots in the selected slice of data to be simultaneously printed is reduced by logically allocating the data among complementary submatrices. Each submatrix of data is printed substantially aligned with each corresponding submatrix to represent the entire selected slice of data. Each submatrix of data is printed at a different time so that there is a reduction in the number of data dots simultaneously printed at substantially every print location.

BRIEF DESCRIPTION OF THE DRAWINGS

The objects, features and advantages of the invention are more fully understood by reading and understanding the following description of a preferred embodiment of the invention, with reference to the accompanying drawings.

FIG. 1 is a schematic diagram illustrating a typical dot matrix printer that is compatible with the present invention.

FIG. 2 is a schematic diagram illustrating the impacting end of a print head for a typical 8-wire dot matrix wire printer as may be used in the printer of FIG. 1, and the letter "E" formed thereby as the print head moves across a print line.

FIG. 3 is a schematic diagram of five slices of binary data as may be stored to print the character "E" as illustrated in FIG. 2.

FIG. 4 is a schematic diagram illustrating the apparatus for operating a printer in accordance with the present invention.

FIG. 8 illustrates diagrammatically an example of a look-up table addressed by the data to be printed to determine the sequence in which the data dots are printed.

DESCRIPTION OF THE INVENTION

Figure 5:
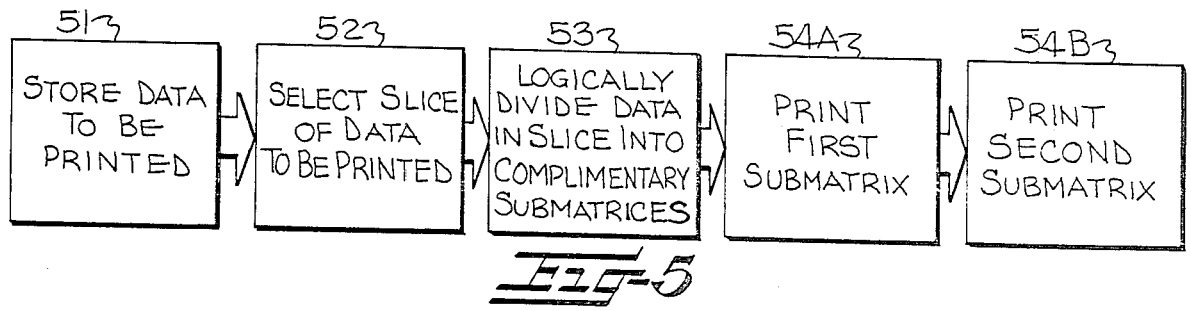
FIG. 5 is a block diagram illustrating the sequence of logical operations used in the present invention to quietly print data in two passes of the print head.

The invention is described as applied to a printer of the type illustrated diagrammatically in FIG. 1, although it is to be understood that the invention is compatible with other dot matrix display devices. A dot matrix printer typically includes a platen 1 over which a print medium or web 2 is moved by means of two tractor devices or pin wheel drives 3, 4. The print medium may be, for example, a continuous web of paper having holes 7 parallel to the edges thereof. Each tractor device includes a wheel or belt 5 provided with outwardly extending pins 6 on the surface thereof. The pins 6 engage the holes 7 formed in the web to provide a positive drive. The two tractor wheels 5 are mounted on a common shaft 8 which may be rotated as required by a motor 9 to advance the medium over the platen. The motor 9 is typically controlled by a print medium or web control, as illustrated in FIG. 4.

The printer includes a traversing print head 11 which is mounted on a support 12 extending over the platen 1 so that the medium 2 passes between the platen and the print head 11. The print head 11 can be moved along support 12 by motor 13 by way of a belt or rotating threaded shaft. The movement of the print head is controlled by a print head movement controller, as illustrated in FIG. 4. The combined movement of the paper and the movement of the print head allow the print head to reach most any point on the surface of the medium 2.

The impacting portion of the print head 11, as illustrated in FIG. 2, is typically formed in part with a column of eight printing elements 14 arranged in a 1 by 8 vertically oriented matrix and supported in a body portion 15. The elements 14 are typically individual wires which can be selectively moved axially by, for example, an electromagnet. Each wire is separately linked to an electromagnet so that it may be individually fired as necessary or desirable in timed relation with the movement of the print head 11. Each fired print wire drives an inked ribbon (not shown) onto the medium 2 to form a dot thereon.

As the print head 11 traverses the width of the paper along the length of the support 12, the data defining the characters to be printed is provided to the electromagnets in a coordinated, timed sequence that fires the associated print wires. Moving from left to right, as shown by arrow 18, the print wires 14 are selectively operated to simultaneously print the complete left vertical column of the character first, then to sequentially print the succeeding vertical columns on a column by column basis until the rightmost column is printed. Specifically, as the print head 11 reaches the print location of column 0 for the letter E as illustrated in FIG. 2, print wires 1 through 7 are simultaneoully advanced to strike the ribbon against the print medium, printing the seven dots for column 0, and are then retracted. As the print head approaches the first location of column 1, print wires 1, 4, and 7 are simultaneously advanced, and this pattern continues as the print head moves through the print locations of columns 2, 3, and 4 ultimately to print the entire character as illustrated. The size and position of the character and the distance between adjacent dots in the horizontal direction is controlled by varying the speed of movement of the head in relation to the timing of the operation of the printing elements. The spacing of the dots in the vertical direction corresponds to the spacing of the printing elements 14 and the movement or po ition of the web.

To print characters, it is necessary to store, or have otherwise available, a matrix of binary data, with each matrix defining, at least in part, the shape of a respective character. This data is schematically illustrated as 1's and 0's, and FIG. 3 illustrates the logical ones and zeros as may be stored in a character data storage device to represent the binary data elements defining the shape of the letter E of FIG. 2. The matrix includes, for example, five vertical columns labelled 0–4 and eight horizontal rows labelled 0–7 that together form a 5×8 matrix defining each character. When a binary 1 is stored in a data storage location, the corresponding printing element is operated to imprint a dot on the printing medium, and when a binary 0 is stored the printing element is not operated.

FIG. 4 illustrates diagrammatically an example of apparatus for displaying dot matrix characters that may be selectively printed in a normal mode or quiet mode, in accordance with the present invention. The circuitry includes a control unit 31, a character data storage 32, a logic unit 33, a print medium or web control 34 connected to the web motor 9, a print head movement control 36 connected to the print head motor 13, and a print head actuator 35 connected to the print head 15 to control the actuation of each of the individual print wires 14.

The control unit 31 includes means for enabling the "quiet write38 mode, means for governing and coordinating the data processing and mechanical functions of the printer, and means for communicating with a host computer. Management of the data processing may include control of the character data storage means 32 and the logic unit 33. Control of the mechanical operation of the printer may include control of the movement of the web and print head, and the actuation of the print wires in a timed sequence with movement of the web and print head.

The binary data defining the character elements is stored in the character data storage means 32, which may include a plurality of storage devices such as semiconductor memories. Operation of the character data storage means is governed by the control unit 31. Binary data representing either a dot or a blank in a matrix of positions arranged in horizontal rows and vertical columns is stored and represents the data to be printed, such as a character. Alternatively, this data may be provided by a host data processor. As a further alternative, the character data storage 32 may be a print buffer containing data representing a graphical image to be printed.

The logic unit 33, in response to signals (including data) from the control unit 31 and character data storage 32, includes means for selecting a slice of data from the character data storage means, means for logically reducing the number of data dots by allocating the data among complementary submatrices, and means for outputting this data to the print head in a properly timed sequence. As instructed by the control unit, the "quiet write" functions of the logic unit 33 may be enabled by the operator as desired, such as by a pushbutton switch on the front panel of the printer.

The web control 34, in response to signals from the control unit 31, provides signals to the motor 9 to control the movement of the web 2 over the platen and past the print head.

The print head movement control 36, in response to signals from the control unit 31, provides signals to the print head motor 13 to control the translational movement of the print head along support 12 and across the web 2.

The print head actuator 35, in response to signals from the control unit 31, provides signals to actuate the individual printing elements 14 of the print head 11 in accordance with the data signals from the data storage unit 32 and from logic unit 33. The control unit 31 typically coordinates the flow of data to the print head actuator with the physical movement of the print head.

As previously mentioned, the print head noise is a function of the number of print wires simultaneously fired at any instant in time. The present invention accordingly reduces printer noise by reducing the number of wires to be fired simultaneously. This is done by logically allocating or distributing the data dots to be printed over time spaced printing operations, e.g. multiple passes of the print head across the print medium. By prudent selection of the wires to be fired on each pass of the print head, noise can be minimized while data throughput is optimized. The throughput optimization consists of minimizing the number of passes required, and printing the passes at the highest allowable speed.

Referring to FIG. 5, a block diagram illustrates the sequential flow of logical operations necessary to print in the quiet mode. In block 51 a matrix of data to be printed is stored. The data may be supplied as the output from a host computer or it may be stored within the printer in a read only memory, and it is typically stored in the previously described matrix of eight rows and five columns. One skilled in the art will readily appreciate that the data may be stored or processed in any convenient manner. However, to aid in describing the present invention it is assumed that the data is stored as illustrated in FIG. 3 in a pattern that represents the data dots substantially as they are to be printed on the web.

A slice of data is selected from the data to be printed, as illustrated in block 52. This slice of data is an entire vertical column of data as would normally be simultaneously printed by the print wires at one print location. Thus, this slice of data is taken in the direction parallel to the linear printing matrix defined by the print wires 14 of the print head. In the illustrated embodiment the slice is represented by any one of the vertically oriented columns 0-4 of eight binary data bits (see FIG. 3).

The number of data dots in the selected slice of data to be simultaneously printed is reduced by logically allocating the data into complementary submatrices, as illustrated in block 53. The data is allocated by logically dividing it substantially in half, forming a pair of complementary submatrices that together comprise the entire selected slice of data. It is to be understood, however, that the data could be allocated among a different number of submatrices.

Each submatrix of data is printed at a different time, as illustrated in blocks 54A, 54B, so that there is a reduction in the number of data dots simultaneously printed at substantially every print location. Each submatrix is aligned with its companion or complementary submatrix (submatrices), and when the printing operations are finished the entire slice of data will have been printed.

Figure 6:
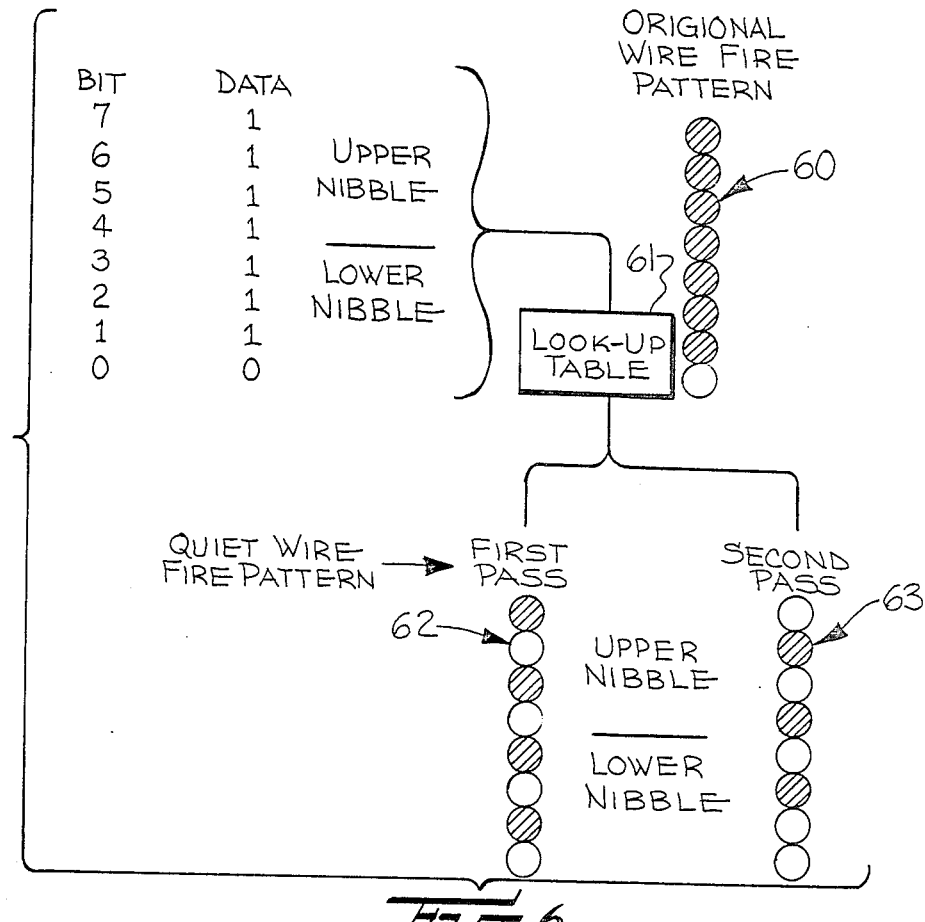
FIG. 6 illustrates diagrammatically the logical operations performed on a slice of data to be printed to logically divide it for quiet operation, in accordance with one embodiment of the invention.
Figure 7:
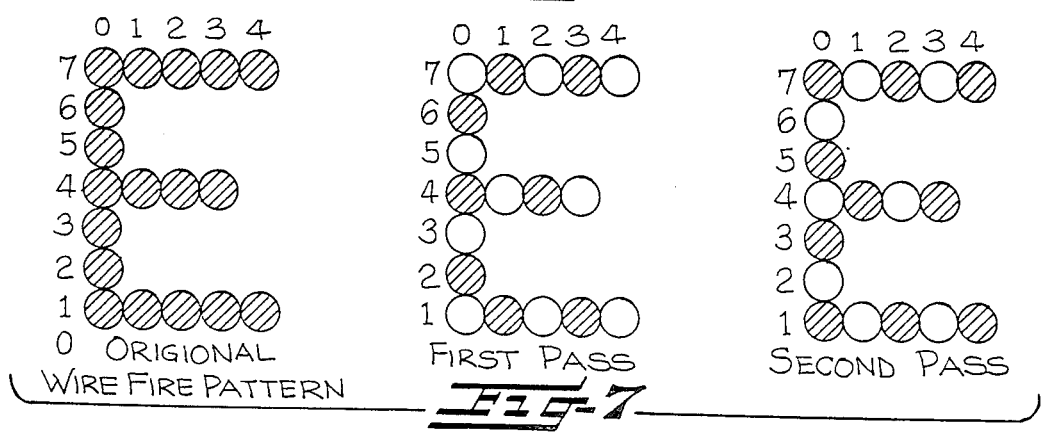
FIG. 7 illustrates diagrammatically the data dots representing the character "E" of FIG. 2, and the data dots printed on the respective first and second passes of the print head during quiet operation for the present invention.

The logical allocation of the data in the selected slice is further described in FIGS. 6, 7 and 8. In FIG. 6, the first slice of data is selected from column 0 of the data stored in the matrix of FIG. 3. This slice of data represents an original wire fire pattern 60 as shown in FIG. 6, and it occupies bit positions 0 through 7, with positions 0 through 3 and 4 through 7 being defined as the lower and upper nibbles, respectively.

Using the upper and lower nibbles of the original wire fire pattern as addresses, a look-up table 61 is accessed to define how the original data will be logically divided into two complementary submatrices 62, 63. The look-up table (FIG. 8) contains the two pass quiet wire fire patterns for every possible nibble pattern, i.e. $2^4$ or 16 possible combinations. The data slice is divided into upper and lower nibbles to reduce the number of bit combinations which must be addressed to determine which wires should be fired on each pass of the print head across the print medium. Alternatively, a look-up table with $2^8$ address locations or other dimensions can also be used in accordance with the invention.

Suitable control means, such as control unit 31 of FIG. 4, records whether the print head is on its first or second pass, whether the selected slice is odd or even, and whether the upper or lower nibble data pattern is being used to address the look-up table. Using this information, the addressed data in the look-up table defines the data dots to be printed on each of the first and second passes of the print head. In this example, the original data slice of seven data dots has been divided into two submatrices of four and three dots, which together comprise the original wire fire pattern 60.

The invention may be practiced in a real time mode, with the quiet wire pattern being generated in timed sequence with movement of the print head. In this mode the original wire fire data pattern from the character data storage 32 or other print line buffer is read out in timed sequence with the translational movement of the print head. The quiet wire fire pattern data is read from the look-up table, assembled into a full column (upper and lower nibbles) and provided to the print head actuator 35 so that it is not necessary to store the data for the quiet wire fire pattern. Upon completing the first pass, the same original wire fire data pattern is again selected in a timed sequence to assemble the complementary quiet wire fire pattern for the second pass. Alternatively, both quiet wire fire patterns may be generated, with one being used in real time for the current printing pass and one being stored for use in the succeeding printing pass.

As previously mentioned, all stored data is ultimately printed in two passes of the print head. A distinction between even and odd numbered slices is made to more closely divide the data in half and optimize noise reduction in all cases. For example, the printing of two horizontal rows of adjacent or overlapping data dots could result in the printing of all dots on one pass, and no dots on the second pass. By distinguishing between first and second passes, adjacent data dots are arbitrarily allocated and printed on alternate passes of the print head, reducing noise. Thus, on the first pass of the print head, for even numbered slices, the upper portion of the bit pattern to be printed is addressed by the upper nibble and selected from the first data column of FIG. 8; and the lower portion of the bit pattern to be printed is addressed by the lower nibble and selected from the second data column of FIG. 8. Similarly, for odd numbered slices, the bit pattern addressed by the upper nibble is selected from the second data column and the bit pattern addressed by the lower nibble is selected from the first data column.

The operation of the invention will now be described by example, with specific reference to the printing of the letter "E" as shown in the figures; however, it is noted that this discussion is extendable to any data to be printed. Referring to FIG. 4, the binary data representing the character "E" to be printed is shown in FIG. 3 as a matrix of binary 1 and binary 0 data bits. This data is transferred to a character data storage device 32 of FIG. 4. Assuming left to right printing, the first slice of data selected is the left-most column containing a binary 0 at bit position 0 and binary 1's at bit positions 1 through 7, as shown in FIG. 6. In the prior art, all seven bits would be printed simultaneously in one pass of the print head. According to the present invention, the slice is divided into a lower nibble comprising bits 0 through 3 (0111) and an upper nibble comprising bits 4 through 7 (1111). Since this is the first slice to be printed, it is arbitrarily assigned to be even data slice "0". The data in the upper and lower nibbles is then used as the address to access the wire fire replacement table to determine which data dots to print in the first pass of the print head. Thus, the table indicates that for an even data slice, first pass, lower nibble, and bit pattern 0111, that the bit pattern 0010 is identified as a first component. Similarly, for the even data slice, first pass, upper nibble, and data pattern 1111, that the bit pattern 1010 is identified as the second component. These bit pattern components are combined to form the wire fire pattern 00101010 (see FIGS. 6 and 7) which is output to the print head on the first pass. The next slice of data, column 1 of FIG. 3, has data bits of 01001001 divided into lower nibble 0100 and upper nibble 1001. The nibbles themselves are again used to address the proper data locations of the look-up table. Since this is an odd column number, the resulting first pass print data from the table is the bit pattern 01000001. This process is repeated in sequence for each data slice on the first pass. A signal is then sent to indicate that the first print pass has been completed. This enables the portion of the look-up table corresponding to the second print pass.

The second print pass, assuming left to right printing, again begins with the first slice of data to be printed, even data slice "0," which contains the same data as used for the first pass. The data is again divided into lower nibble bit pattern 0111 and upper nibble bit pattern 1111. However, the data to be printed on this second pass is defined in a different portion of the look-up table, and is complementary to that printed on the first pass. Thus, the first component corresponding to the lower nibble is 0010, and the second component corresponding to the upper nibble is 1010. Thus, with the second pass of the print head, the entire slice for column 0 has been printed. The next data slice, column 1, is then selected for processing. It contains the binary data 01001001, and is divided into lower nibble 0100 and upper nibble 1001 for addressing the look-up table. The corresponding data from the look-up table for an odd slice, second print pass is 0000, and 1000, which is collectively output to the print head. This process is repeated until all of the available slices have been printed.

In addition to reducing by about one half the number of data dots that are simultaneously fired at each print position, the look-up table is designed to reduce the firing frequency of each wire by separating adjacent dots by a space, both vertically and horizontally. See, for example, FIG. 7. By so decreasing the firing frequency, the print head speed may be increased while still achieving the desired print density. This compensates for the reduction in throughput that is inherent in this invention. Moreover, the higher print head speeds and increased number of passes create additional head movement, increasing the airflow over the heat sink and reducing heat buildup.

In the drawings and specification, there has been set forth a preferred embodiment of the invention, and although specific terms are employed they are used in a generic and descriptive sense only and not for purposes of limitation. Rows and columns may be interchanged, and the orientation of the print wires may be changed. In addition the invention may be used for overlapping dots, and it may allocate the data between more than two submatrices, or more than two nibbles, as necessary or desirable.

That which is claimed:

1. A method of quieting the operation of a dot matrix printer by logically dividing the data to be printed among time spaced printing operations, the method comprising:
    (a) storing a matrix of data to be printed;
    (b) selecting a slice of the data from the stored matrix of data to be printed, the slice of data representing the data dots to be simultaneously printed;
    (c) logically allocating the data from the selected slice among complementary submatrices to reduce the number of data dots in the selected slice that are to be simultaneously printed independently of the location of the data within the data slice; and
    (d) a printing each submatrix of data at a different time so that there is a reduction in the number of data dots simultaneously printed at substantially every print location, each submatrix of data being printed aligned with any complementary submatrices to represent the entire selected slice of data.

2. The method of claim 1 wherein the step of logically allocating the data comprises logically dividing the data to be printed in each slice between first and second complementary submatrices, regardless of the location of the data within the data slice.

3. The method of claim 1 wherein the step of printing each submatrix of data at a different time comprises:
    (a) printing a first submatrix of data; and (b) printing a second, complementary submatrix of data substantially aligned with the first submatrix of data to represent the entire selected slice of data, but at a time different than the printing of the first submatrix of data.

4. The method of claim 1 wherein the step of logically allocating the data from the selected slice of data comprises addressing a predetermined data table with the data in the selected slice of data to logically identify the complementary submatrices.

5. A method of quieting the operation of a dot matrix printer by logically dividing the data to be printed among time spaced printing passes, the method comprising:
(a) storing a matrix of data to be printed;
(b) selecting a slice of the data from the stored matrix of data to be printed, the slice of data representing the data dots to be simultaneously printed;
(c) logically allocating the data from the selected slice among first and second complementary submatrices to reduce the number of data dots in the selected slice to be simultaneously printed independently of the location of the data within the data slice;
(d) printing the first submatrix of data; and
(e) printing the second submatrix of data substantially aligned with the first submatrix of data to represent the entire selected slice of data, but at a time different than the printing of the first submatrix of data so that there is a reduction in the number of data dots simultaneously printed at substantially every print location.

6. The method of claim 5 wherein the step of storing a matrix of data to be printed comprises storing, for each sequential print location, all of the data to be printed at each print location.

7. The method of claim 5 wherein the step of selecting a slice of the data from the stored matrix of data comprises selecting a slice of data parallel to the linear printing matrix of the print head.

8. The method of claim 5 wherein the printer has a reciprocating print head that moves parallel to a horizontally oriented line of reading, and wherein the step of selecting a slice of the data comprises selecting a vertically oriented column of data from the stored matrix of data to be printed.

9. The method of claim 5 wherein the step of logically allocating the data from the selected slice of data comprises addressing a predetermined data table with the data in the selected slice of data to logically identify a first submatrix and a second submatrix complementary to the first submatrix.

10. The method of claim 5 wherein the step of printing the first submatrix of data comprises printing the first submatrix of data during a first pass of the print head and the step of printing the second submatrix of data comprises printing during a second pass of the print head over the same print line as the first pass of the print head.

11. The method of claim 5 wherein the step of logically allocating the data comprises
logically dividing the slice of data into upper and lower data portions;
addressing a first predetermined data table using the data in each upper and lower slice portion and logically identifying first upper and lower submatrices that correspond to the data in the upper and lower data portions;
logically combining the first upper and lower submatrices and forming a first submatrix having approximately one half as many data dots as the slice of data;
addressing a second predetermined data table complementary to the first predetermined data table using the data in each upper and lower slice portion and logically identifying second upper and lower submatrices that correspond to the data in the upper and lower data portions; and
logically combining the second upper and lower submatrices and forming a second submatrix complementary to the first submatrix.

12. The method of claim 5 wherein the step of logically allocating the data comprises logically dividing the data into a first submatrix having approximately one half of the data dots of the slice of data and a second submatrix having the other approximately one half of the data dots of the slice of data.

13. The method of claim 5 wherein the step of logically allocating the data further comprises logically allocating the data by separating data dots by a data space so as to eliminate adjacent data dots in each submatrix.

14. The method of claim 5 further including the initial step of selecting a quiet print mode for printing the data to be printed.

15. A method of quieting the operation of a dot matrix printer by logically dividing the data to be printed among time spaced printing passes, the method comprising:
(a) storing a matrix of data to be printed;
(b) selecting, for a first printer operation, a slice of the data from the stored matrix of data to be printed;
(c) logically allocating approximately one half of the data dots in the selected slice of data into a first submatrix independently of the location of the data within the data slice;
(d) printing the first submatrix of data on a first printing pass;
(e) selecting, for a succeeding printing operation, the same slice of data from the stored matrix of data to be printed;
(f) logically allocating to a second submatrix the other approximately one half of the data dots complementary to the first submatrix; and
(g) printing the second submatrix of data substantially aligned with the first submatrix of data but at a time different than the printing of the first submatrix of data so that there is a reduction in the numer of data dots simultaneously printed at substantially every print location.

16. Apparatus for quieting the operation of a dot matrix printer by logically dividing the data to be printed among time space printing passes, the apparatus comprising:
(a) means for storing a matrix of data to be printed;
(b) means for selecting a slice of the data from the means for storing a matrix of data to be printed;
(c) means for logically allocating the data from the selected slice among complementary submatrices independently of the location of the data within the data slice to reduce the number of data dots in the selected slice of data to be simultaneously printed; and
(d) means for printing each submatrix of data substantially aligned with each other submatrix of data to represent the entire selected slice of data, said means printing each submatrix at a different time, so that there is a reduction in the number of data dots simultaneously printed at substantially every print location.

* * * * *

UNITED STATES PATENT AND TRADEMARK OFFICE
CERTIFICATE OF CORRECTION

PATENT NO. : 4,758,103

DATED : July 19, 1988

INVENTOR(S) : Tim V. Angst; Mark E. Bunke; Phuc K. Do; Nicholas J. Krull; Demetrios Troupes; Carol E. Wyke It is certified that error appears in the above-identified patent and that said Letters Patent is hereby corrected as shown below:

Column 4, line 29: change "po ition" to read -- position --.

Column 4, line 57: delete "quiet write38" and insert -- "quiet write" -- .

Column 6, line 36: change "24" to read -- $2^4$ -- .

Column 6, line 41: change "28" to read -- $2^8$ -- .

Signed and Sealed this

Twenty-second Day of November, 1988

Attest:

DONALD J. QUIGG

Attesting Officer

Commissioner of Patents and Trademarks